United States Patent
Kayser

[11] Patent Number: 5,571,066
[45] Date of Patent: Nov. 5, 1996

[54] HEATABLE ROLL FOR CALENDERING OR SMOOTHING SYSTEMS

[75] Inventor: Franz Kayser, Geldern, Germany

[73] Assignee: Voith Sulzer Finishing GmbH, Krefeld, Germany

[21] Appl. No.: 405,080

[22] Filed: Mar. 16, 1995

[30] Foreign Application Priority Data

Mar. 26, 1994 [DE] Germany .......................... 44 10 675.0

[51] Int. Cl.⁶ .................................................. B23P 15/00
[52] U.S. Cl. .................................. 492/46; 165/89
[58] Field of Search ........................ 492/46; 165/89; 219/619, 469, 647

[56] References Cited

U.S. PATENT DOCUMENTS

| | | | |
|---|---|---|---|
| 4,229,950 | 10/1980 | Fessenden | 492/46 |
| 4,658,716 | 4/1987 | Boissevain | 492/46 |
| 4,964,202 | 10/1990 | Pav | 492/46 |
| 5,074,019 | 12/1991 | Link | 492/46 |
| 5,254,070 | 10/1993 | Callhoff | 492/46 |
| 5,393,959 | 2/1995 | Kitano et al. | 219/619 |
| 5,420,395 | 5/1995 | Hyllberg et al. | 492/46 |

FOREIGN PATENT DOCUMENTS

| | | |
|---|---|---|
| 0295655 | 5/1992 | European Pat. Off. . |
| 3814794 | 11/1989 | Germany . |
| 3014891 | 11/1989 | Germany . |
| 4107440 | 2/1992 | Germany . |
| 9301416 U | 5/1993 | Germany . |

Primary Examiner—Irene Cuda
Attorney, Agent, or Firm—Darby & Darby, P.C.

[57] ABSTRACT

A heatable roll (2) for calendering, smoothing and similar systems and a method for operating the roll incorporating an inductively operating external heating system (9) and an internal heating system (13). The internal heating system is limited to the end sections of the roll. On reaching a preset temperature level at the roll ends, the heat output of the internal system can be reduced or preferably switched off. As a result, the heating-up period of the roll is shortened, the design of the roll is kept simple, and thermal stressing of the roll is reduced.

9 Claims, 1 Drawing Sheet

HEATABLE ROLL FOR CALENDERING OR SMOOTHING SYSTEMS

FIELD OF THE INVENTION

This invention relates to a method for heating a heatable calendering or smoothing roll with trunnions at each end, in which the roll is simultaneously heated both internally and externally over its effective working width. It also relates to a heatable calendering or smoothing roll with trunnions at each end having an external inductively operated heating system extending over the effective width of the roll and an internal heating system to implement the method.

BACKGROUND OF THE INVENTION

EP 0 295 655 B1 describes a roll of this type in which the internal heating system extends over the same width as the external heating system and is continuously in the active state during normal operation so as to minimize the temperature difference between the outer and the inner surface of the roll shell in order to prevent excessive stress from being generated in the material of the roll. The document recognizes that unacceptably high stress is created in the roll if one or the other of the two heating systems becomes inactive.

DE-OS 38 14 794 describes a technique whereby the shell of a load-deflection compensating roller, supported by a rotationally fixed arbor, is internally heated by a liquid heat carrier while an inductive external heating device is provided at both ends. This approach permits the utilization of a larger effective width of the roll.

Similar solutions in which the ends of the roll shell are heated by means of a liquid heat carrier are described in DE 41 07 440 C1 and DE 93 01 416 U1.

DE 30 14 891 C2 describes a calender roll which is heated only from within by means of a liquid heat carrier. The end sections of the roll are supplied with a heat-carrying liquid by way of special ducts, separate from the roll main section between its two ends. This results in a very complicated internal structure of the roll. The desired effect is always to obtain a thermally even, cylindrical surface over the full length of the roll when it is heated. The problem is therefore related to the functional operation of the roll rather than the heating process.

BRIEF DESCRIPTION OF THE INVENTION

This invention is aimed at keeping the structural design of a heatable calender roll simple while permitting rapid heating of the roll.

According to this invention, the heating inside the roll is limited to the two ends, and the heat generated is reduced as soon as the roll ends have reached a given set-point temperature.

Due to their considerable mass, rolls of the type discussed require a relatively long time for heating their surface from room temperature to the operating temperature at which the roll can be used. The underlying concept for their structural design is that the rate at which the roll is heated up is limited not by the need to obtain highest possible thermal uniformity on the inside and outside but rather by the need to avoid tension cracks and stress breaks by supplying enough thermal energy to the end faces and trunnions of the roll. According to the invention, this is accomplished by means of an internal heating system limited to the roll ends. This approach permits a more rapid heating process. Even at this high heating rate it is sufficient to inductively heat the roll from the outside only since the heat will be diffused relatively quickly into the interior of the roll. Therefore, even without the incorporation of an internal heating system extending essentially along the length of the roll, the temperature differences resulting in the heating process will not be large enough to cause any excessive mechanical stress.

However, the internal heat source may operate at full capacity during the heating-up cycle only. As soon as the roll is in operation, heat will be drawn over its entire effective length by the web being processed. Outside that web there is no such heat transfer and the roll ends would overheat if the internal heating were not reduced.

In the simplest form, the internal heat source is switched off upon reaching a preset temperature level. Since the internal heating device needed for this purpose is used only occasionally, its life span is considerable. Also, a simple switch unit will suffice.

According to this invention, a heatable roll that lends itself to this heating process is characterized by an internal heating system limited to the end sections of the roll, a temperature gauge in the area of at least one roll end section, and a switch unit which commutates or switches off the internal heating system as soon as the temperature measured by the gauge reaches a preset limit.

The switching process may be automated. Also, since it is a reasonable assumption that the thermal conditions are relatively identical at both ends of the roll, it will suffice in many cases to gauge the temperature at only one end.

The internal heating system may be of any conventional design, electrical resistance heating being particularly recommended.

For especially good results the internal heating system should be located next to an end face of the roll. It is also advantageous to have it extend into the trunnions. In this manner, the heat is transferred directly to the most vulnerable elements.

BRIEF DESCRIPTION OF THE DRAWINGS

The invention is described in more detail by way of a design example schematically illustrated in FIG. 1.

DETAILED DESCRIPTION OF THE INVENTION

Figure 1:
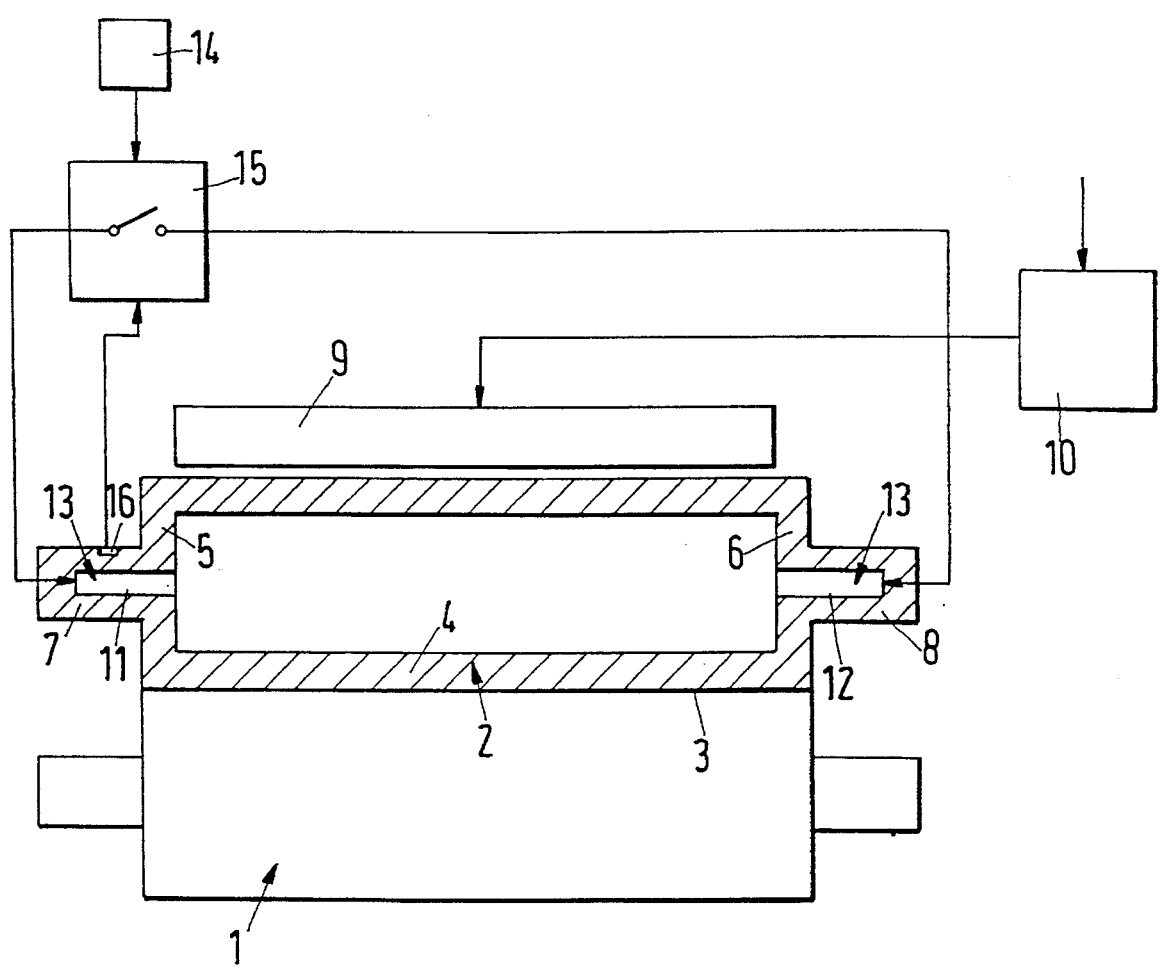

FIG. 1 shows a calender consisting of two rolls 1 and 2 of metal or other suitable material with a gap 3 between them in which a web-type material (not shown), in particular a web of paper, is heat and pressure-treated. The bearings, drive system and relative roller pressure follow standard design parameters and are not illustrated in detail.

Roll 2 is heatable. It includes a cylinder 4 with two end faces 5 and 6 and two trunnions 7 and 8. An inductively operating external heating system 9 extends over the entire effective working width, or nearly the entire length, of roll 2. It is energized by a regulated alternating-current source 10. Electromagnetic induction generates heat in the area of the surface of roll 2 as a result of which that surface attains a certain desired temperature and the web of paper processed attains certain properties.

The ends of roll 2 are provided with two electric resistance heaters 11 and 12 which together form the internal heating system 13. The heaters are located near the roll end faces 5 and 6, respectively, and extend into the trunnions 7 and 8, respectively. The heaters are supplied power from a power supply 14 by way of a switch unit 15. The switch unit 15 is controlled as a function of the temperature which is measured by a temperature sensor 16 located in the area of one end of the roll. As soon as a preset temperature limit is exceeded, the switch unit 15 either shuts off or at least reduces the electrical power fed to the heaters 11 nd 12.

In regular operation, only the inductive external heating system 9 is active. It provides sufficient heat to the surface of the roll cylinder 4 for that surface to retain the desired operating temperature in spite of the thermal drain caused by the web being processed.

The internal heating system 13 is essentially active only during the initial heating-up period in which the roll is brought from room temperature to its operating temperature. During this time span the heat generation by both heating systems 9 and 13 is balanced in a way that throughout the entire roll body there are no excessive temperature differentials that would create unacceptably large mechanical stress. The use of the internal heating system 13 permits a substantially faster rate at which the roll heats up. That rate is largely determined by the conditions at the roll ends, with the temperature differences between the inside and the outside of the cylinder 4 being of secondary significance.

I claim:

1. The combination comprising:

a heatable calendering or smoothing roll with trunnions at each end, an inductively operated external heating system extending over the effective working width of the roll;

an internal heating system limited to each of the end sections of the roll being located adjacent a roll end face;

a temperature sensor in the area of at least one roll end; and a switch means responsive to said sensor which interrupts the internal heating system when the temperature measured by said sensor reaches a preset limit.

2. The combination of claim 1, wherein the internal heating system comprises an electrical resistance heater.

3. The combination of claim 1 wherein the internal heating system is positioned next to each roll end face.

4. The combination of claim 2 wherein the internal heating system is positioned next to each roll end face.

5. The combination of claim 1 wherein the internal heating system extends into each of the trunnions.

6. The combination of claim 2 wherein the internal heating system extends into each of the trunnions.

7. The combination of claim 3 wherein the internal heating system extends into each of the trunnions.

8. Method for heating a heatable calendering or smoothing roll with trunnions at each end comprising:

initially simultaneously heating the roll both internally and externally over its effective working width with the internal heating limited to the area of the roll end sections, and reducing the heat output when a preset temperature is reached at the roll ends.

9. Method as in claim 8, wherein the internal heating is switched off as soon as the preset temperature limit is reached.

* * * * *

UNITED STATES PATENT AND TRADEMARK OFFICE
CERTIFICATE OF CORRECTION

PATENT NO. : 5,571,066
DATED      : November 5, 1996
INVENTOR(S) : Franz Kayser

It is certified that error appears in the above-indentified patent and that said Letters Patent is hereby corrected as shown below:

Title page, item

[30] Foreign Application Priority Data:

Change "44 10 675.0" to -- P 44 10 675.0 --.

Signed and Sealed this

Twenty-eighth Day of January, 1997

Attest:

BRUCE LEHMAN

*Attesting Officer*   *Commissioner of Patents and Trademarks*